(12) United States Patent
Simpson et al.

(10) Patent No.: US 6,745,856 B2
(45) Date of Patent: Jun. 8, 2004

(54) METHODS AND APPARATUS FOR DISPOSING OF DELETERIOUS MATERIALS FROM A WELL

(75) Inventors: Barry Simpson, Colinas de Valle Arriba (VE); Fabio Manotas, Caracaibo (VE); Tim Barr, Port of Spain (TT)

(73) Assignee: M-I, L.L.C., Houston, TX (US)

( * ) Notice: Subject to any disclaimer, the term of this patent is extended or adjusted under 35 U.S.C. 154(b) by 0 days.

(21) Appl. No.: 10/196,914

(22) Filed: Jul. 17, 2002

(65) Prior Publication Data

US 2004/0011562 A1 Jan. 22, 2004

(51) Int. Cl.[7] ............................................... E21B 21/06
(52) U.S. Cl. ..................... 175/66; 175/206; 175/207; 175/88
(58) Field of Search ............................ 166/66, 88, 206, 166/207, 267

(56) References Cited

U.S. PATENT DOCUMENTS

| | | | |
|---|---|---|---|
| 3,777,405 A | 12/1973 | Carwford ..................... | 34/57 |
| 4,507,208 A | 3/1985 | Simon et al. ................ | 210/721 |
| 5,964,304 A | 10/1999 | Morrison, Jr. et al. ........ | 175/38 |
| 6,106,733 A | 8/2000 | Wood ......................... | 210/774 |
| 6,179,071 B1 | 1/2001 | Dietzen ....................... | 175/66 |
| 6,345,672 B1 | 2/2002 | Dietzen ....................... | 175/66 |

*Primary Examiner*—Roger Schoeppel
(74) *Attorney, Agent, or Firm*—Osha & May L.L.P.

(57) ABSTRACT

An improved method and apparatus for processing deleterious material on a floating vessel during transportation from a well to a disposal site. The vessel contains equipment for the slurrification and agitation of the deleterious material. Such equipment includes storage tanks, slurrification units, and agitation units, as well as transfer equipment such as flow lines and vacuum or pump means. The deleterious material is transferred from the drill site to the storage tanks on the vessel. The vessel then transports the material to a disposal site, such as an injection well. During transportation, the deleterious material is processed. Such processing can include slurrification and/or agitation of the deleterious material to maintain the slurry, adding fluid if necessary. Once at the disposal site, the deleterious material slurry is then transferred from the vessel to the disposal site.

38 Claims, 4 Drawing Sheets

METHODS AND APPARATUS FOR DISPOSING OF DELETERIOUS MATERIALS FROM A WELL

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The embodiments relate generally to well drilling. More particularly, the embodiments relate to the processing of the drilling cuttings, drilling mud, and/or other waste that is generated from a well. Specifically, the embodiments relate to improved methods and apparatus for disposing of deleterious materials from a well using a floating vessel to transport the materials from the well to a final disposal site.

2. Description of the Related Art

In the drilling of wells, a drill bit is used to dig many thousands of feet into the earth's crust. Oil rigs typically employ a derrick that extends above the well drilling platform. The derrick supports joint after joint of drill pipe connected end to end during the drilling operation. As the drill bit is pushed further into the earth, additional pipe joints are added to the ever lengthening "string" or "drill string". The drill string therefore comprises a plurality of joints of pipe. Each pipe joint has an internal, longitudinally extending bore.

Fluid "drilling mud" is pumped from the well drilling platform, through the drill string, and to a drill bit supported at the lower or distal end of the drill string. The drilling mud lubricates the drill bit and carries away well cuttings generated by the drill bit as it digs deeper. The cuttings are carried in a return flow stream of drilling mud through the well annulus and back to the well drilling platform at the earth's surface. When the drilling mud reaches the platform, it is contaminated with small pieces of shale and rock that are known in the industry as well cuttings or drilling cuttings. Once the drilling cuttings, drilling mud, and other waste reach the platform, a "shale shaker" is typically used to remove the drilling mud from the drilling cuttings so that the drilling mud may be reused. The remaining drilling cuttings, waste, and residual drilling fluid are then transferred to a holding trough for disposal. In some situations, for example with specific types of drilling mud, the drilling mud may not be reused and it must also be disposed. Typically, the non-recycled drilling mud is disposed of separate from the drilling cuttings and other waste by transporting the drilling mud via a vessel to a disposal site.

The disposal of the drilling cuttings and drilling mud is a complex environmental problem. Drilling cuttings contain not only the residual drilling mud product that would contaminate the surrounding environment, but also can contain oil and other waste that is particularly hazardous to the environment, especially when drilling in a marine environment.

In the Gulf of Mexico, for example, there are hundreds of drilling platforms that drill for oil and gas by drilling into the subsea floor. These drilling platforms can be used in places where the depth of the water can be many hundreds of feet. In such a marine environment, the water is typically filled with marine life that cannot tolerate the disposal of drilling cuttings waste. Therefore, there is a need for a simple, yet workable solution to the problem of disposing of well drilling cuttings, drilling mud, and/or other waste in an offshore marine environment and in other fragile environments.

Traditional methods of disposal have been dumping, bucket transport, cumbersome conveyor belts, screw conveyors, and washing techniques that require large amounts of water. Adding water creates additional problems of added volume and bulk, messiness, and transport problems. Installing conveyors requires major modification to the rig area and involves many installation hours and very high cost.

Another method of disposal includes returning the drilling cuttings, drilling mud, and/or other waste via injection under high pressure into an earth formation. Injection into deeply-buried rock formations is a relatively recent field. In general terms, the injection process involves the preparation of a slurry within surface-based equipment and pumping the slurry into a well that extends relatively deep underground into a receiving stratum or adequate formation. The basic steps in the process include the identification of an appropriate stratum or formation for the injection; preparing an appropriate injection well; formulation of the slurry, which includes considering such factors as weight, solids content, pH, gels, etc.; performing the injection operations, which includes determining and monitoring pump rates such as volume per unit time and pressure; and capping the well.

The principal advantage of this technique is the potential for stable retention of material within a deeply-buried formation over a geological time span. However, in practice, the injection process is not as simple as it may seem.

First, the material to be injected must be prepared into a slurry acceptable to high pressure pumps used in pumping material down a well. The particles are usually not uniform in size and density, thus making the slurrification process very complicated. In addition, if the slurry is not the correct density, the slurry often plugs circulating pumps. The abrasiveness of the material particles can also abrade the pump impellers causing cracking. Some attempts have been made to use the circulating pumps for grinding the injection particles by purposely causing pump cavitation. However, using the pumps for grinding shortens the life of the pump. Hard cakes also can build up in tanks and create circulation problems. Therefore, it is known that a uniform particle size of less than 300 micron must be maintained for proper formation injection at the well site. However, maintaining such consistency with hard and soft materials is very difficult.

Second, space on offshore platforms is at a premium and therefore injection equipment must be compact and as lightweight as possible. Also, the equipment is most often placed in hazardous areas near the well bore where large horsepower internal combustion engines are not permitted due to the possibility of high gas concentration. Therefore, any additional equipment on the offshore platform used for injection must also meet stringent explosion proof requirements for such areas of the rig.

Until now, injection has not gained wide acceptance in offshore drilling operations such as in the North Sea, primarily due to the problems discussed above and the inefficiency and ineffectiveness of the injection processes. Injection failures have occurred primarily due to the inability to fine tune the injection process by providing particle size control, uniform slurry density, and to provide volume and pressure control over the injection process. Additionally, locating an adequate stratum or formation for the injection has also been difficult. As a result, most offshore drilling operators in the North Sea have banned the practice and have resorted to using expensive synthetic drill fluids.

In order to provide a more efficient and cost effective method of processing drilling cuttings, drilling mud, and/or other waste for disposal, the present invention has been developed. Other objects and advantages of the invention will appear from the following description.

SUMMARY OF THE PREFERRED EMBODIMENTS

The preferred embodiment provides an improved method and apparatus for processing well deleterious material on a floating vessel during transportation from an offshore well to a disposal site. Deleterious material can include, but is not limited to, drilling cuttings, drilling mud, and/or other waste products, or any combination thereof. It should be appreciated that processing can include, but is not limited to, slurrification, agitation, separation, and/or chemical treatment, or any combination thereof. The vessel contains equipment for the processing of the deleterious material. Such equipment includes, but is not limited to, slurrification equipment, storage tanks, and/or agitation equipment, as well as transfer equipment such as flow lines and vacuum or pump means. The deleterious material is transferred from the well to the storage tanks on the vessel. The vessel then transports the material to a disposal site, such as an injection well rig. During transportation, the deleterious material is processed. Once at the disposal site, the deleterious material is then transferred from the vessel to the disposal site. Thus, using the vessel to process the deleterious material during transportation to the disposal site saves the operation time and equipment costs associated with processing at the offshore well or at the disposal site. Including the processing equipment on the vessel also saves needed space at the disposal site, especially in the context of an off-shore injection well.

In another embodiment, the deleterious material is transferred from the well to a floating storage vessel next to the well. This saves space on the well rig platform that is normally used for storage tanks. The deleterious material is then transferred from the floating storage vessel to the floating vessel for transportation from the well to the disposal site. The method then proceeds as in the preferred embodiment.

In another embodiment, the floating vessel is equipped with chemical treatment units that further process the deleterious material. The chemical treatment processes are also performed on the vessel during transportation to the disposal site.

In yet another embodiment, the floating vessel is equipped with treatment units that separate and recycle drilling mud from the drilling cuttings, waste, or other deleterious material. The recycling process may also be performed on the vessel during transportation to the disposal site, but may also be performed at the offshore well.

Thus, the preferred and alternative embodiments comprise a combination of features and advantages that enable them to overcome various problems of prior devices. The various characteristics described above, as well as other features, will be readily apparent to those skilled in the art upon reading the following detailed description of the preferred and alternative embodiments, and by referring to the accompanying drawings.

BRIEF DESCRIPTION OF THE DRAWINGS

For a more detailed description of the preferred and alternative embodiments, reference will now be made to the accompanying drawings, wherein.

DETAILED DESCRIPTION OF THE PREFERRED EMBODIMENT

Figure 1:
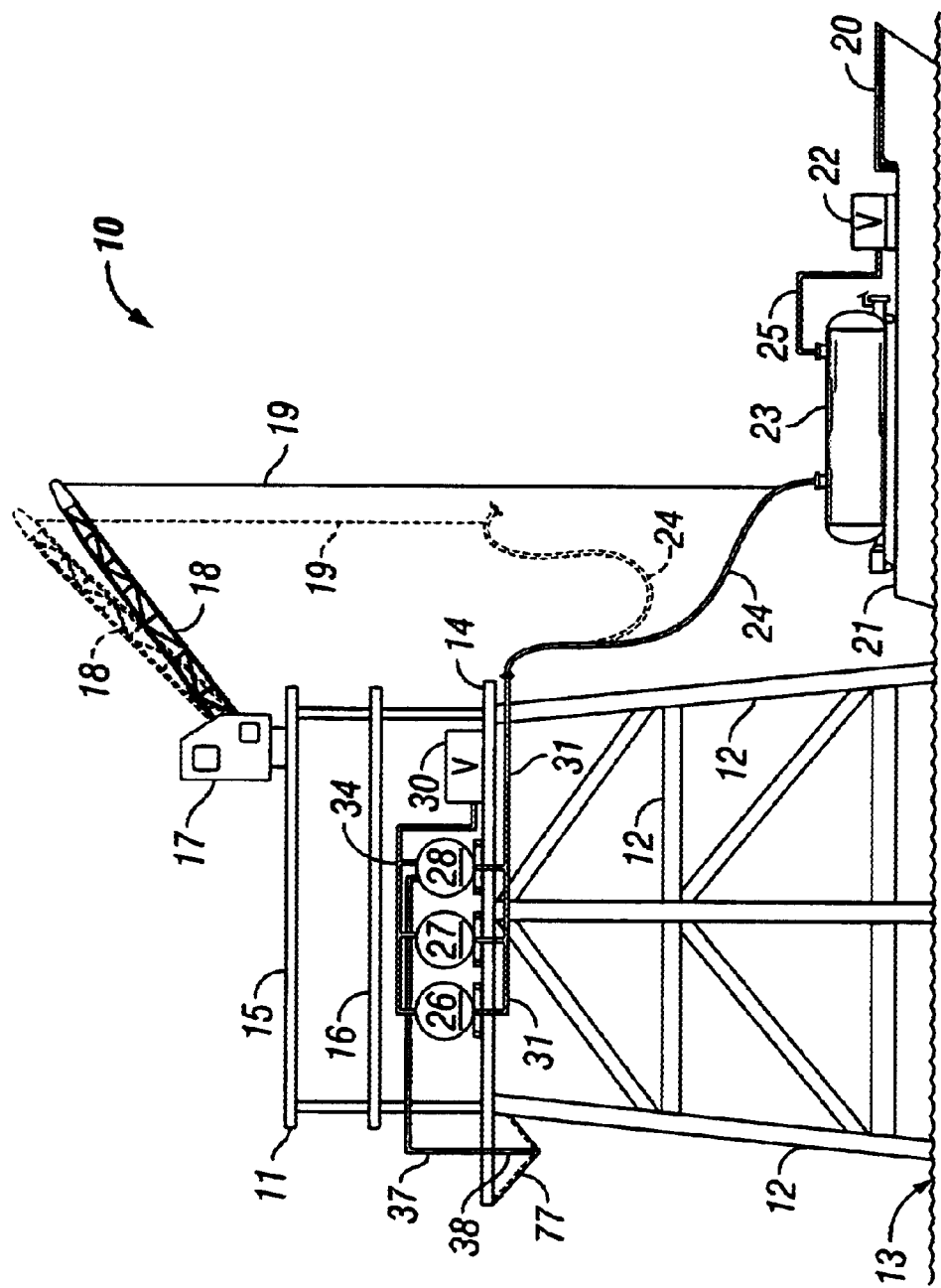
FIG. 1 is an elevational view of the floating vessel and the drilling rig constructed in accordance with the preferred embodiment.

While preferred embodiments of this invention are shown and described, modifications can be made by one skilled in the art without departing from the spirit or teaching of this invention. The embodiments described are exemplary only and are not limiting. Many variations and modifications of the apparatus and methods are possible and are within the scope of the invention. Accordingly, the scope of protection is not limited to the embodiments described here, but is only limited by the claims that follow, the scope of which shall include all equivalents of the subject matter of the claims.

In the description that follows, like parts are marked throughout the specification and drawings with the same reference numerals, respectively. The drawing figures are not necessarily to scale. Certain features may be shown in exaggerated scale or in somewhat schematic form and some details of conventional elements may not be shown in the interest of clarity and conciseness. It should be appreciated that the term deleterious material includes, but is not limited to, drilling cuttings, mud, and/or other waste products, or any combination thereof.

Figure 2:
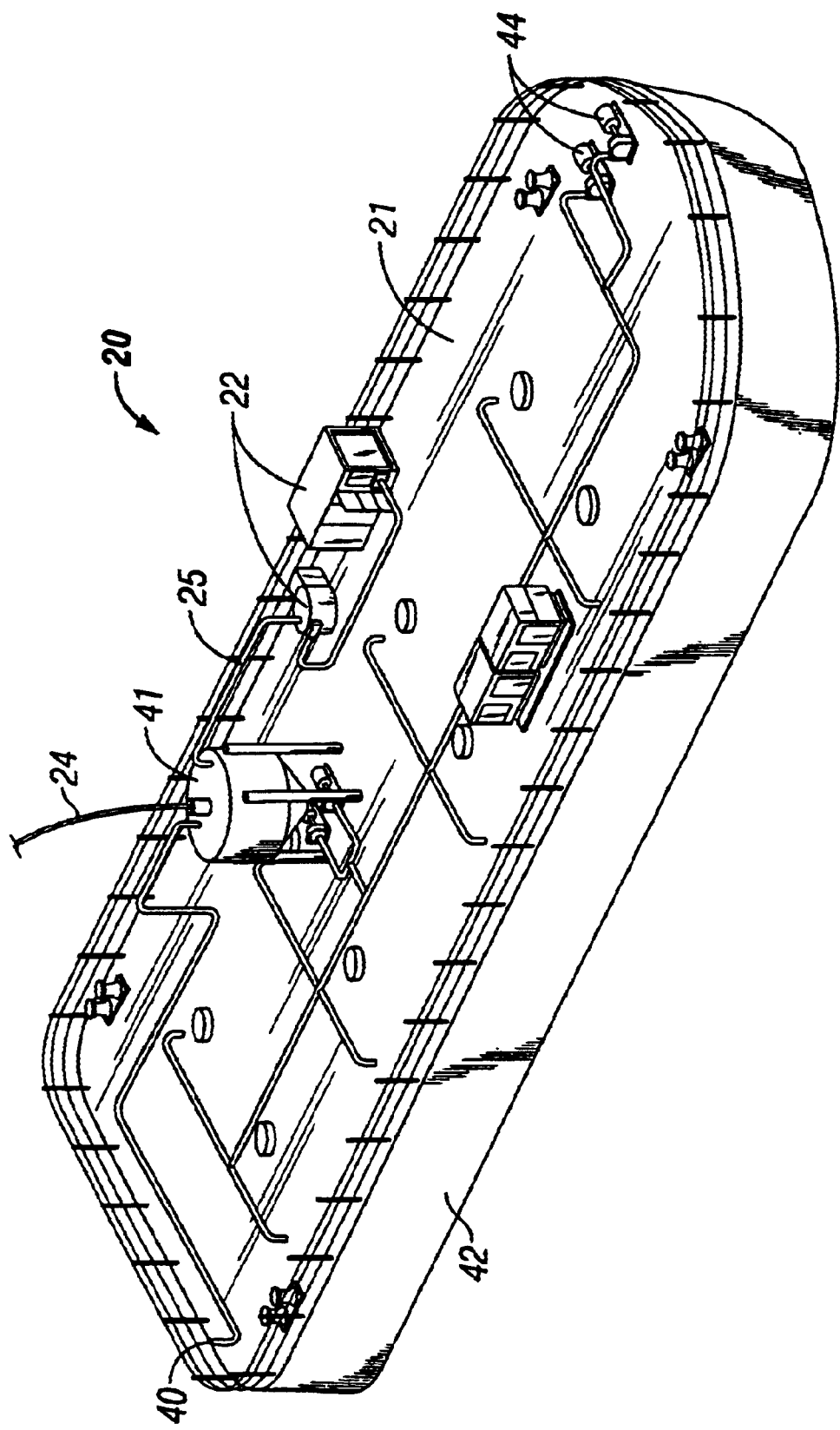
FIG. 2 is a perspective view of a floating vessel constructed in accordance with the preferred embodiment.

FIGS. 1 and 2 show generally the preferred embodiment of a drilling rig 10 and a floating vessel 20. The drilling rig 10 may also be a workover rig or any other type of production facility for a well. The drilling rig 10 includes an offshore oil and gas well drilling platform 11. The platform 11 can include a lower support structure or jacket 12 that extends to the ocean floor and a short distance above the water surface 13. The platform 11 can also be a jack-up rig, a semi-submersible, a production barge, or a drilling barge. A superstructure is mounted upon the jacket 12. The superstructure includes a number of spaced apart decks including lower deck 14, upper deck 15, and an intermediate deck 16. Such a platform 11 typically includes a lifting device such as crane 17 having boom 18 and lifting line 19. The drilling rig 10 includes one or more tanks 26–28 for holding drilling cuttings and other materials that have been removed from the well bore during drilling. In general, the concept of an offshore well platform is well known in the art. It should be appreciated that this invention does not require any particular configuration of the rig platform or its equipment.

A floating vessel 20 is shown next to rig 10 for use in practicing the method of the preferred embodiment. Vessel 20 has deck 21 that supports vacuum unit 22, vacuum lines 25, and one or more storage tanks 23. It should be appreciated that the preferred embodiment does not require an exact configuration of the equipment on vessel 20. For example, as shown in FIG. 2, the tanks 23 may be located below deck 21. In addition, other transfer equipment, such as pumps, pneumatic transfer systems, and mechanical transfer systems such as screw conveyors may be included on the vessel 20 to transfer the deleterious material instead of vacuums. One skilled in the art would know how to configuring the equipment on vessel 20 as the design parameters require.

The tanks 23 on boat 20 are preferably very large tanks, each having a volume, for example, of between 100 and 1000 barrels. The tanks 26–28 on platform 11 can be, for example, between about 50 and 1000 barrels in volume each. The vessel 20 preferably includes six 1000 barrel tanks. A rig flowline 24 can be used to form a removable connection between the plurality of rig vacuum tanks 26–28 and the vessel storage tanks 23. The rig flowline 24 can be attached for example to a discharge manifold 31.

During well operations, a receptacle on rig 11 such as trough 77 receives deleterious material that is removed from the well bore. Material in trough 77 is then moved to one or more of the storage tanks 26–28 using a vacuum unit 30 connected to suction manifold 34 via a suction line. An additional suction manifold 37 communicates with each of the tanks 26–28 and with trough 77 via suction intake 38. In this fashion, valving enables deleterious material to be transmitted to any selected tank 26–28. In addition, other transfer equipment, such as pumps, pneumatic transfer systems, and mechanical transfer systems such as screw conveyors may be used to transfer the deleterious material instead of vacuums.

With the vessel 20 next to the rig 10, rig flowline 24 connects to slurrification unit 41 (shown in FIG. 2) that is connected to vessel vacuum unit 22. The vacuum unit 22 then suctions the deleterious material from the rig 10 to slurrification unit 41 via vacuum lines 24 and 25. Slurrification unit 41 then slurries the deleterious material by circulating the deleterious material through circulation systems (not shown) as the solids in the deleterious material are ground to a predetermined small size. It should be understood that a slurry is a mixture of solids suspended in a fluid. It should also be appreciated that the amount of slurrification can be controlled to create, for example, a slurry of a desired consistency. The slurrification may also include adding any necessary fluid to the deleterious material to create a desired consistency. Preferably, the deleterious material is slurried until it forms a substantially homogeneous mixture.

From slurrification unit 41, the deleterious material is then transferred to storage tanks 23 on the vessel. Again, it should be appreciated that storage tanks 23 may be located either above or below vessel deck 21. The vessel 20 uses valves 40 and flowlines 42 to selectively transfer the deleterious material to the tanks 23. Once the transfer of the deleterious material is complete, the rig flowline 24 is disconnected from the slurrification unit 41 and the vessel 20 then transports the deleterious material to a disposal site, such as an injection well. It should be appreciated, however, that the disposal site may be a location other than an injection well. For example, the disposal site may be an on-shore disposal facility.

During transportation, the deleterious material is agitated within the tanks 23 to keep the solids of the deleterious material suspended in the fluid. It should be appreciated that agitation includes manipulating the deleterious material to maintain the slurry. In other words, the deleterious material is agitated enough to maintain the solids suspended in the fluid. The agitation need not be continuous. The agitation units may include, but are not limited to, screw augers and/or pump and circulation systems. One skilled in the art would be able to decide the proper agitation equipment. The tanks 23 may alternatively include additional slurrification units for further slurrification of the deleterious material during transportation if needed.

Figure 3:
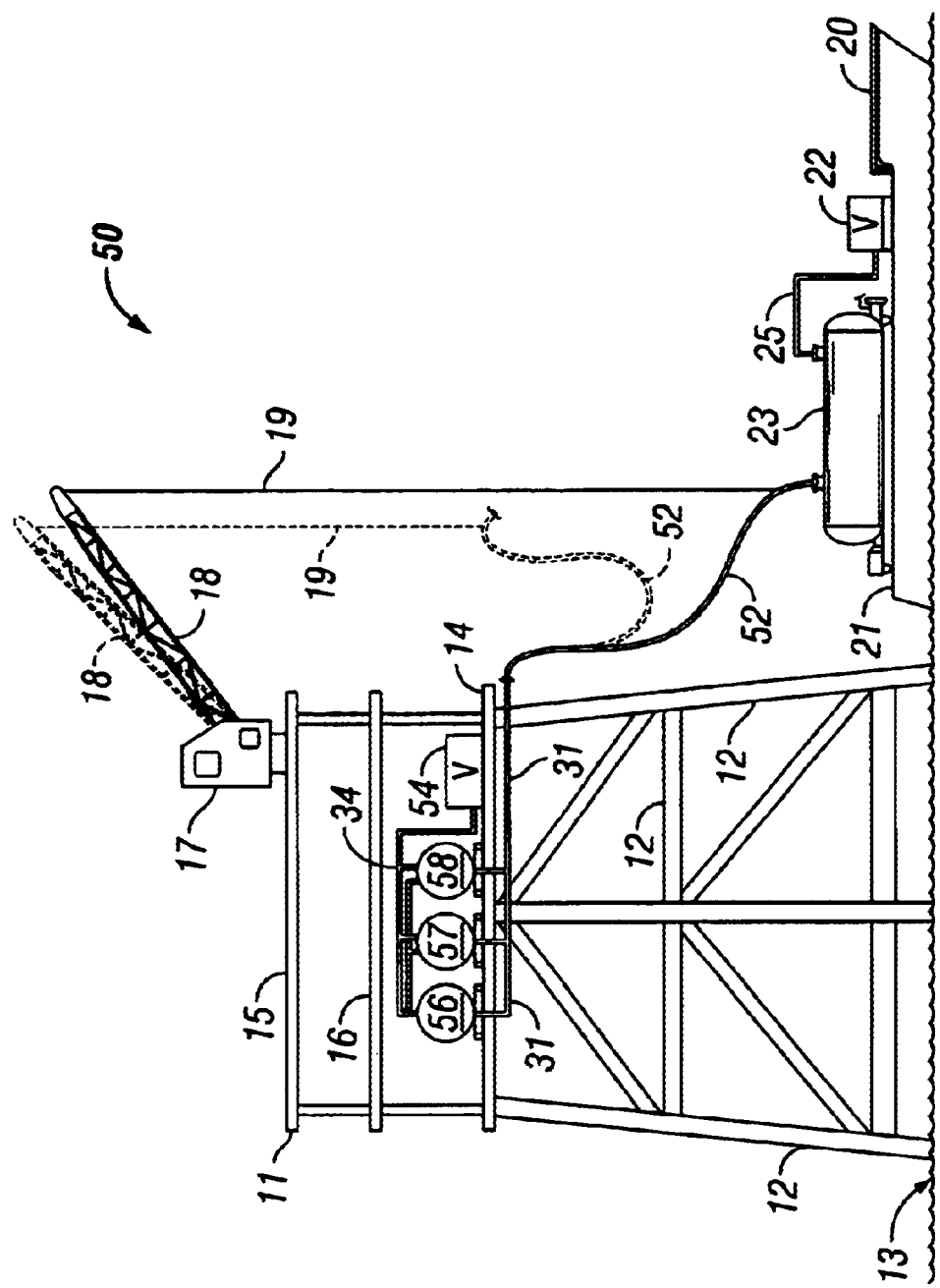
FIG. 3 is an elevational view of the floating vessel and an injection rig constructed in accordance with the preferred embodiment.

Once at the disposal site, the deleterious material is then pumped or vacuumed from the vessel tanks 23 to the disposal site. In addition, other transfer equipment, such as pneumatic transfer systems, and mechanical transfer systems such as screw conveyors may also be used to transfer the deleterious material. As shown in FIG. 3, the preferred embodiment disposal site is an injection rig 50 located offshore. It should be appreciated, however, that the invention is not limited to any one type of disposal site. To remove the deleterious material from the tanks 23, a flowline 52 attached to a vacuum unit 54 on the injection rig 50 attaches to manifolds 44 (shown in FIG. 2). The manifolds 44 may also include pumps to assist in delivery of the deleterious material. The deleterious material is then transferred from the tanks 23 to storage tanks 56–58 on the injection rig 50 for later injection into an earth formation.

Thus, using equipment on the vessel 20 to process the deleterious material during transportation to the disposal site offers numerous advantages. The time saved associated with not having to agitate the deleterious material at the disposal site allows the entire disposal process to become more efficient and cost effective. Locating the processing equipment on the floating vessel allows for increased cost savings by decreasing the amount of actual equipment needed to operate the disposal site itself. Including the processing equipment on the vessel 20 also saves needed space at the disposal site, especially in the context of an off-shore injection rig. Including the agitation equipment on the vessel also makes the disposal process more efficient and cost effective in situations where placement of certain agitation equipment at the disposal site creates a hazardous operating environment. The system also allows the easy transfer of wastes from the vessel to the disposal site by delivering the waste in an easy to pump slurry as opposed to systems where a pump is used but that require the addition of liquid and the use of manual labor at the disposal site to obtain a pumpable material. The system also avoids the need for using transfer equipment such as rig cranes that are used to move large waste containers. Avoiding the use of large transfer equipment not only saves time but also reduces the risks of having an accident or a spill. Additionally, avoiding the use of a rig crane allows the crane to be used for other purposes associated with the well operations. The system also allows for the disposal of waste drilling mud as well as drilling cuttings at the same time as opposed to previous methods that required separate disposal of the mud and cuttings waste.

In an alternative embodiment, the tanks 23 include slurrification units as well as any needed agitation equipment. Thus, there is no need for the slurrification unit 41. The deleterious material is transferred directly into the tanks 23. The slurrification may also include adding any necessary fluid to the deleterious material to create a desired consistency.

Figure 4:
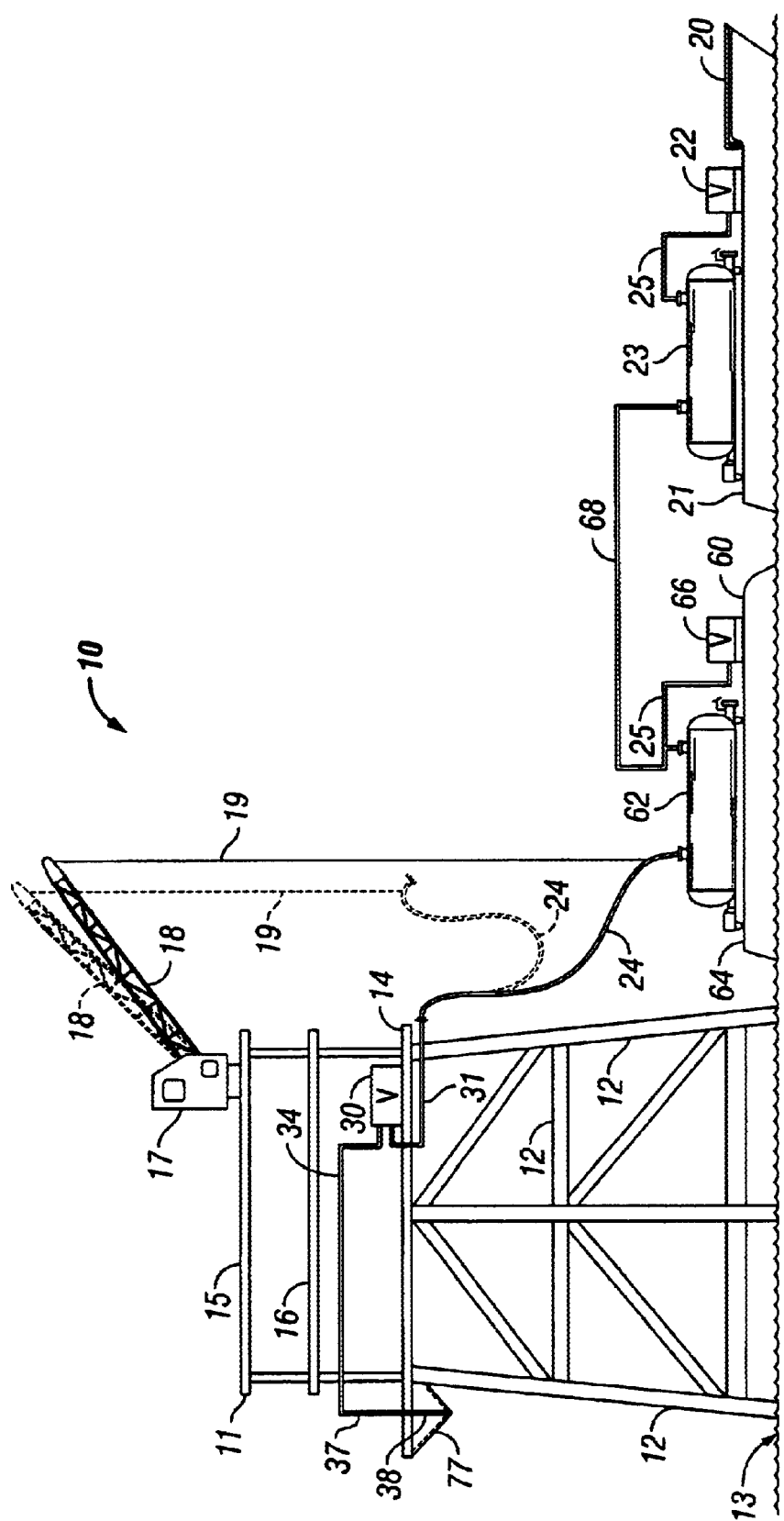
FIG. 4 is an elevational view of the floating vessel, floating storage tank, and drilling rig constructed in accordance with a first alternative embodiment.

FIG. 4 shows an additional alternative embodiment. Instead of having tanks 26–28 located on the platform 11, the deleterious material is transferred from trough 77 to a storage barge 60. The storage barge 60 includes a holding tank 62 that can either be located above or below the deck 64. The deleterious material is transferred in the same way as described above in the preferred embodiment, but with the addition of vacuum unit 66 located on the barge 60. In this alternative embodiment, the deleterious material is then transferred from the barge 60 to the vessel 20 using flowline 68 in a similar manner as flowline 24 in the preferred embodiment. After transferring the deleterious material to the vessel 20, the deleterious material is processed and transported by the vessel 20 to the disposal site as described in the embodiments above. Having the deleterious material stored on the storage barge 60 saves space on the drilling rig platform 11 that is normally used for storage tanks 26–28.

In another embodiment, the vessel 20 is equipped with chemical treatment units that process the deleterious material during transportation to the disposal site. Such chemical treatment units are well known to those skilled in the art. Alternatively, the vessel 20 may also be equipped with treatment units that seperate and recycle drilling mud from the other deleterious material. The recycling process may be performed on the vessel 20 during transportation to the disposal site or may be performed at the offshore well. The equipment used for the recycling process is known to those skilled in the art.

Although the invention has been described in considerable detail with reference to certain preferred and alternate embodiment, other embodiments are possible. Accordingly, the spirit and the scope of the claims should not be limited to the description of the embodiments above.

What is claimed is:

1. A method of disposing of deleterious material from a well comprising:
   transferring the deleterious material from the well to a floating vessel; and
   agitating the deleterious material on the floating vessel while the floating vessel travels to a disposal site.

2. The method of claim 1 further comprising forming a slurry containing the deleterious material, said slurry being formed on the floating vessel.

3. The method of claim 2 wherein forming the slurry further comprises adding fluid to achieve a predetermined consistency.

4. The method of claim 2 wherein the slurry is substantially homogeneous.

5. The method of claim 1 wherein the deleterious material is transferred from the well to a storage tank on the vessel via a means for transferring the deleterious material.

6. The method of claim 1 further comprising transporting the deleterious material from the floating vessel to the disposal site via a means for transferring the deleterious material.

7. The method of claim 1 further comprising separating drilling mud from the other deleterious material on the vessel while the vessel travels to the disposal site.

8. The method of claim 7 wherein the separated drilling mud is recycled for further use.

9. The method of claim 1 further comprising chemically treating the deleterious material on the vessel while the vessel travels to the disposal site.

10. The method of claim 1 further comprising storing the deleterious material in at least one rig storage tank before transferring the deleterious material to the floating vessel.

11. The method of claim 10 wherein the deleterious material is transferred from the at least one rig storage tank to the floating vessel.

12. The method of claim 1 further comprising storing the deleterious material on a second vessel near a well rig before transferring the deleterious material to the floating vessel that travels to the disposal site.

13. The method of claim 12 wherein the deleterious material is transferred from the second vessel to the floating vessel that travels to the disposal site.

14. The method of claim 1 wherein the disposal site is an injection rig for an injection well.

15. The method of claim 1 further comprising agitating the slurry on the floating vessel to maintain the deleterious material in a slurry while the floating vessel travels to a disposal site.

16. The method of claim 15 wherein forming the slurry further comprises adding fluid to achieve a predetermined consistency.

17. The method of claim 6 wherein the disposal site is an injection rig for an injection well.

18. A method of disposing of deleterious material from a well comprising:
   transferring the deleterious material from the well to a floating vessel;
   forming a slurry containing the deleterious material on the floating vessel while the floating vessel travels to a disposal site.

19. The method of claim 18 wherein the slurry is substantially homogeneous.

20. The method of claim 18 further comprising transporting the deleterious material from the well to the floating vessel via a means for transferring the deleterious material.

21. The method of claim 18 further comprising transporting the deleterious material slurry from the floating vessel to the disposal site via a means for transferring the deleterious material.

22. The method of claim 18 wherein the disposal site is an injection well.

23. The method of claim 18 further comprising storing the deleterious material in at least one storage tank near the well before transferring the deleterious material to the floating vessel that travels to the disposal site.

24. The method of claim 18 wherein the deleterious material is transferred to at least one storage tank on the floating vessel.

25. The method of claim 18 further comprising storing the deleterious material on a second floating vessel near the well before transferring the deleterious material to the floating vessel that travels to the disposal site.

26. The method of claim 18 further comprising separating drilling mud from the other deleterious material on the vessel while the vessel travels to the disposal site.

27. The method of claim 26 wherein the separated drilling mud is recycled for further use.

28. The method of claim 18 further comprising chemically treating the deleterious material on the vessel while the vessel travels to the disposal site.

29. A method of disposing of deleterious material from a well comprising:
   transferring the deleterious material from the well to a floating vessel;
   processing the deleterious material on the floating vessel while the floating vessel travels to a disposal site.

30. The method of claim 29 wherein the processing of the deleterious material comprises forming a slurry of the deleterious material and agitating the deleterious material slurry to maintain the deleterious material in a slurry while the floating vessel travels to the disposal site.

31. The method of claim 29 wherein the disposal site is an injection well.

32. An apparatus for disposing of deleterious material from a well comprising:
   a means for transferring the deleterious material from a rig for the well to a floating vessel; the floating vessel having a means for processing the deleterious material while the vessel travels to a disposal site; and a means for transferring the deleterious material from the floating vessel to the disposal site.

33. The apparatus of claim 32 wherein the floating vessel further comprises a means for separating drilling mud from the other deleterious material.

34. The apparatus of claim 32 wherein the floating vessel further comprises a means for chemically treating the deleterious material.

35. The apparatus of claim 32 wherein the processing means forms a slurry of the deleterious material while the vessel travels to the disposal site.

36. The apparatus of claim 35 wherein fluid is added to the slurry to achieve a predetermined consistency while the vessel travels to the disposal site.

37. The apparatus of claim 32 wherein the processing moans agitates the deleterious material while the vessel travels to the disposal site.

38. The apparatus of claim 35 wherein the processing means agitates the slurry to maintain the deleterious material in a slurry while the vessel travels to the disposal site.

* * * * *